United States Patent [19]

Kimbrough

[11] Patent Number: 4,858,963

[45] Date of Patent: Aug. 22, 1989

[54] SEALING APPARATUS FOR CONCENTRIC CONDUITS

[76] Inventor: Earl P. Kimbrough, 204 Windsor Rd., Starkville, Miss. 39579

[21] Appl. No.: 220,452

[22] Filed: Jul. 15, 1988

[51] Int. Cl.[4] .............................................. F16L 21/04
[52] U.S. Cl. ...................................... 285/138; 285/93; 285/346; 285/348
[58] Field of Search ...................... 285/138, 346, 133.1, 285/348, 93

[56] References Cited

U.S. PATENT DOCUMENTS

| | | | |
|---|---|---|---|
| 1,163,941 | 12/1915 | Miller | 285/346 X |
| 2,237,680 | 4/1941 | Mark | 285/346 X |
| 2,334,663 | 11/1943 | Whitney | 285/346 X |
| 4,006,921 | 2/1977 | Mohr | 285/348 X |

FOREIGN PATENT DOCUMENTS

| | | | |
|---|---|---|---|
| 2853726 | 6/1980 | Fed. Rep. of Germany | 285/348 |
| 528990 | 5/1958 | Italy | 285/138 |

Primary Examiner—Dave W. Arola
Attorney, Agent, or Firm—Dewitt L. Fortenberry

[57] ABSTRACT

This invention relates, generally, to a sealing apparatus which seals the space between an outer surface of an inner carrying pipe and the inner surface of an outer casing pipe. It consists of a plurality of plates having a compressible material between the plates. The plates and the compressible material are assembled around the carrying pipe so as to fill the space between the outer surface of the carrying pipe and the inner surface of the casing pipe. When it is desired to seal the space between the outer surface of the carrying pipe and the inner surface of the casing pipe, one plate is drawn toward the other plate thereby compressing the compressible material so as to fill that space and insure a perfect seal.

4 Claims, 2 Drawing Sheets

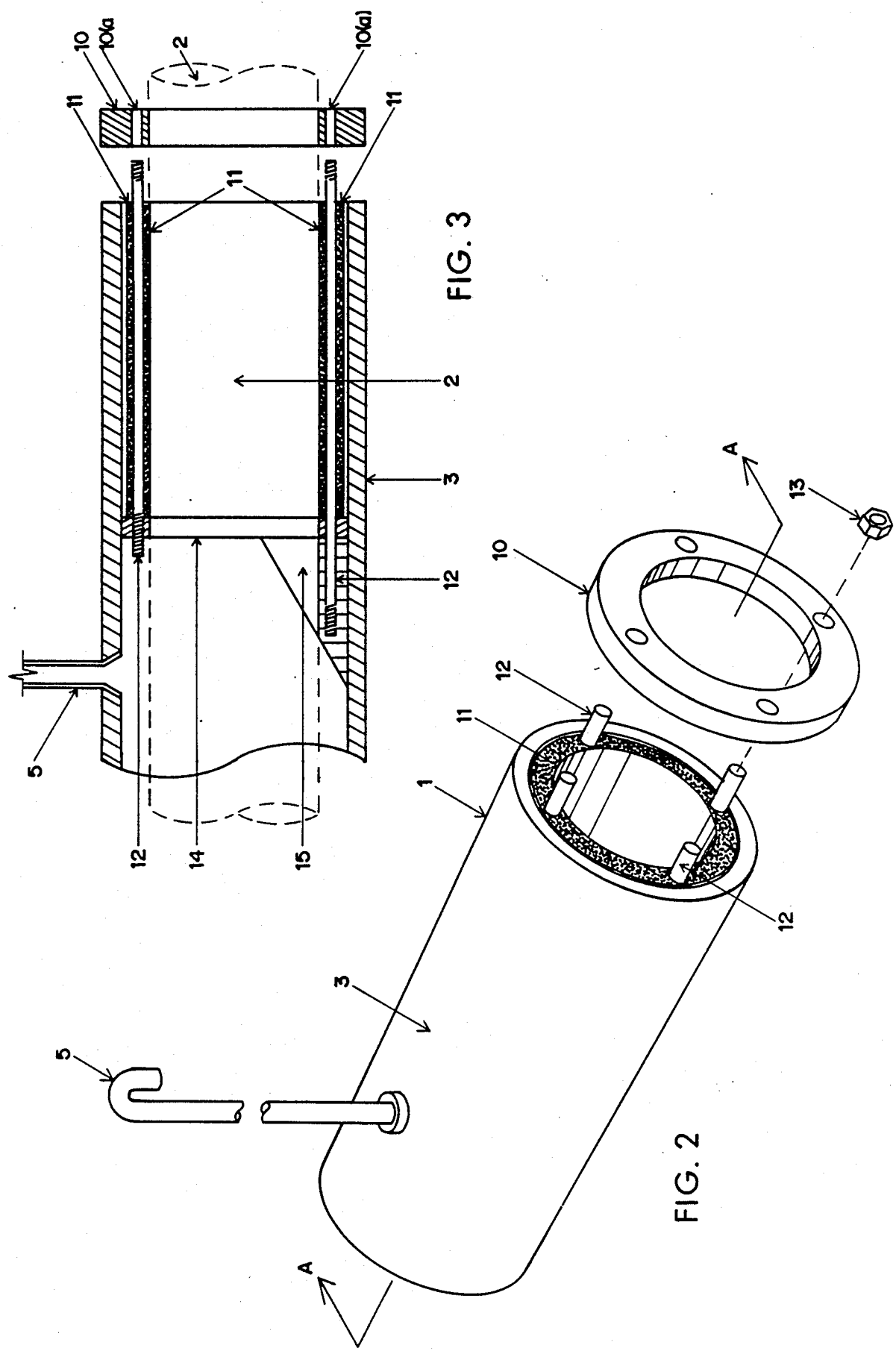

SEALING APPARATUS FOR CONCENTRIC CONDUITS

SUMMARY OF THE INVENTION

This invention relates generally to a sealing apparatus. More particularly, it relates to an apparatus for effecting a seals between the outer surface of an inner carrying pipe and the inner surface of an outer casing pipe.

A wide variety of piping systems are required for any number of materials, including water, gas, oil, various types of chemicals and the like. In many of these instances, the pipe that carries the material is encased in a conduit or a casing pipe of a larger diameter. Alternatively, the carrying pipe may be encased within a casing pipe at strategic points such as under roadbeds, railroad crossings, or ditches. By having the carrying pipe so encased, maintenance and replacement are simplified should the carrying pipe develop a leak.

The problem with current installations, however, is that it is often difficult to achieve a tight seal between the carrying pipe and the surrounding casing pipe. Often, cement or a grout material is used to seal this space. There have also been attempts to provide an apparatus for sealing that concentric space. Two such examples are shown and described in U.S. Pat. No. 2,765,182 entitled "Insulated Sealing Apparatus for Concentric Conduits" and U.S. Pat. No. 2,896,669 entitled "Pipe Casement." Those devices are not satisfactory, however, because of the external parts which are exposed to water, dirt, sand, earth, and other corrosive materials, thereby weakening the seal and subjecting the carrying pipe to contamination.

The present invention is a type of compression seal for the ends of a casing pipe. It consists of a plurality of plates which sandwich a compressible material. The compressable material and plates are of a "doughnut" shape and all fit around the exterior of the carrying pipe and within the casing pipe. When it is desired to form a seal between the carrying pipe and casing pipe, the plates are drawn together thereby compressing the compressible material in a manner so as to fill the gap between the carrying pipe and the casing pipe. Thus, a seal between the outer surface of the carrying pipe and the inner surface of the casing is effected without exposing the sealing apparatus to potentially corrosive elements of nature.

Once the present invention is used to perfect a seal, a one-way pressure relief check valve extending above the ground can be utilized to determine when a leak occurs in the carrying pipe within the area which is sealed off. Without such a mechanism, if there is failure in the carrying pipe, the leak can often go undetected for some time because of the lack of a perfect seal.

It is, therefore, an object of this invention to provide an apparatus for effecting a seal between the outer surface of a carrying pipe and the inner surface of a casing pipe.

An object of this invention is to also provide a sealing apparatus not having external parts and components.

Another object of this invention is to provide a sealing apparatus having a means for determining if there is a leak in the sealed off area.

Also, an object of this invention is to provide a device which is easy to assemble and simple to use.

It is also an object of this invention to make it easier to identify and locate leaks in underground pipes.

These objects, together with other objects and advantages, will become apparent after review of the drawings and detailed description of the invention as more fully hereinafter described and claimed.

A BRIEF DESCRIPTION OF THE DRAWINGS

Referring now to the drawings, wherein like referenced characters refer to like parts throughout the several views, and wherein:

FIG. 2 is a front view of the invention within a casing case.

FIG. 3 is a cut-a-way view of the invention along line A—A of FIG. 2 showing its relationship to the carrying pipe and the casing pipe.

DETAILED DESCRIPTION OF THE INVENTION

Figure 1:
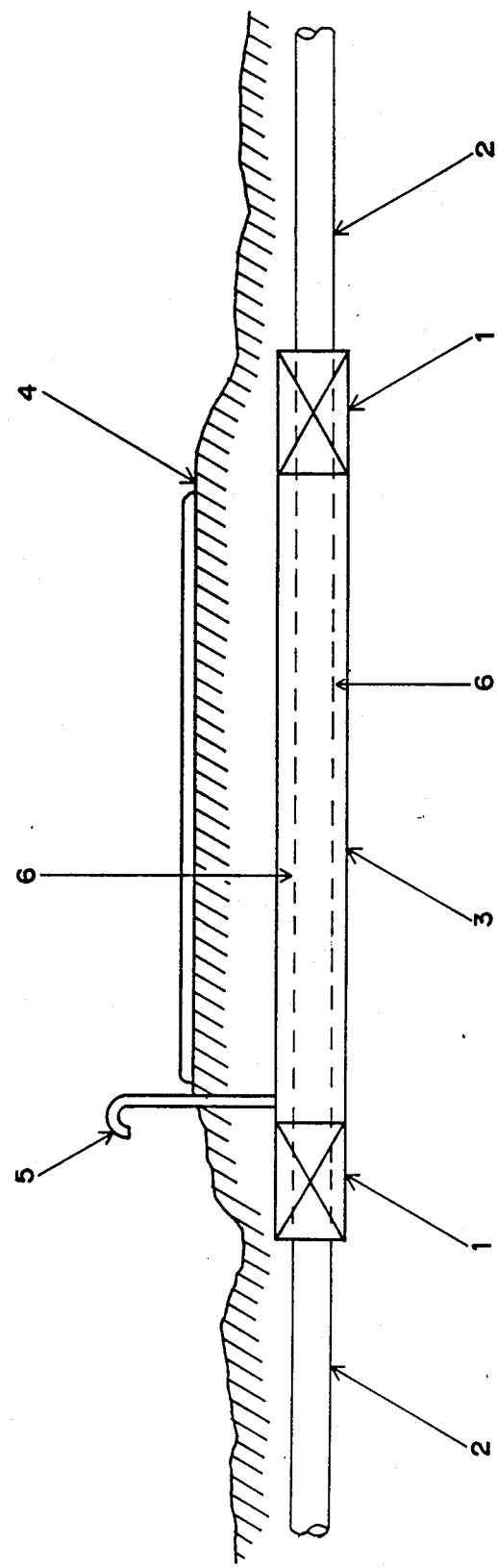
FIG. 1 is a view of the location of the invention as it relates to a carrying pipe and casing pipe extending under a roadbed.

Referring to FIG. 1, the location of the sealing apparatus 1 with respect to the carrying pipe 2 and the casing pipe 3 is shown. In many instances, this arrangement is necessary when pipe systems are used to transport materials under roadbeds. By sealing the space between the outer surface of the carrying pipe 2 and the inner surface of the casing pipe 3, a pressure relief check valve 5 can be used to determine whether a leak is in the sealed off area 6. Thus, invention must maintain a perfect seal under pressure. If the sealing apparatus 1 did not provide a perfect seal, then it would be difficult to determine the location of the leak without tearing up or destroying a portion of the roadbed.

As shown in FIGS. 2 and 3, the sealing apparatus 1 consists of a face plate 10, a compressible material 11, a back plate 14, and a means for drawing the back plate 14 toward the face plate 10, said means being shown as a multiplicity of rods 12 each having a threadably connectable nut 13. A concentric shaped wedge member 15 is also provided adjacent to the back plate 14 so as to support the back plate 14 and also provide a means for supporting the carrying pipe 2 within the casing pipe 3.

The face plate 104, back plate 14, and compressible material 11 are all of a "doughnut shape" so that each defines a passageway for accepting a carrying pipe 2. The face plate 10 may also include a body portion having an outer diameter less than or equal to the inner diameter of the casing pipe 3. Both the back plate 14 and compressible material 11 have an outer diameter less than the diameter of the inner surface of the casing pipe 3. The outer diameter of the face plate 10 is equal to the outer diameter of the casing pipe 3. The rods 12 are threadably secured to the back plate 14 or wedge 15. As shown in FIG. 3, the compressible material 11 also defines a passageway for accepting each rod 12 and the face plate 10 also includes a hole 10(a) for accepting each rod 12. Therefore, as can be seen in FIG. 3, the wedge 15, back plate 14, and compressible material 11 are positioned around the carrying pipe 2 and within the casing pipe 3, with the rods 12 being secured to the back plate 14 or wedge 15, so that said rods 12 extend through said compressible material 11 to a distance outside of said casing pipe 3. The face plate 10 is positioned around the carrying pipe 2 and the face plate 10 is slid against the casing pipe 3 so that each hole 10(a) accepts a connecting rod 12. The nuts 13 are then threadably attached to the rods 12. Thus, as the nuts 13 are tightened, the back plate 14 and/or wedge 15 are drawn toward the face plate 10 thereby compressing the compressible material 11. As the compressible material 11 is compressed, its outer diameter is forced to expand until it comes in contact with the inner surface of the casing pipe 3. A seal is therefore achieved between the outer surface of the carrying pipe 2 and the inner surface of the casing pipe 3 without having parts of the seal 1 exposed to the elements of nature.

When a plurality of seals 1 are positioned as shown in FIG. 1, it is readily seen that the sealed off area 6 is provided. By using a one-way check valve 5, it can therefore be determined if there is a leak in the sealed off area 6. If there is indeed a leak, it can then be determined whether the leak is under the roadbed without the necessity of tearing up the road.

Although particular components have been discussed with the specific embodiment of the invention, other components may be utilized in accordance with the teachings of the present invention. Furthermore, it is understood that although an exemplary embodiment of the invention has been disclosed, other applications and mechanical arrangements are possible and the embodiment disclosed may be subjected to various changes, modifications, and substitutes without departing from the spirit of the invention.

What is claimed is:

1. An apparatus for sealing the ends of a casing pipe located around a carrying pipe which comprises, in combination, a plurality of seals positioned within said casing pipe so that said seals are not exposed to the earth surrounding said casing pipe, said seals each having a back plate with a passageway for slidably accepting said carrying pipe, the outer diameter of said back plate being less than the inner diameter of said casing pipe; a face plate having a passageway for accepting said carrying pipe, the outer diameter of said face plate being equal to the outer diameter of said casing pipe; a compressible material having a passageway therethrough for acceptance of said carrying pipe whereby said compressible material is assembled between said plate plate and said face plate; and means for supporting said carrying pipe within said casing pipe; and, a tightening means for drawing said back plate toward said face plate so as to compress said compressible material so that said compressible material seals the space between the outer surface of said carrying pipe and the inner surface of said casing pipe.

2. The apparatus of claim 1 wherein said means for supporting said carrying pipe within said casing pipe includes attachment means for said tightening means.

3. An apparatus for sealing the ends of a casing pipe located within a carrying pipe which comprises, in combination, a plurality of seals positioned within said casing pipe so that said seals are not exposed to the earth surrounding said casing pipe, said seals each having a back plate with a passageway for slidably accepting said carrying pipe said back plate having an outer diameter less than the inner diameter of said casing pipe; a face plate securable to said casing pipe, said face plate having a passageway for accepting said carrying pipe and said face plate having an outer diameter equal to the outer diameter of said casing pipe; a compressible material having a passageway therethrough for acceptance of said carrying pipe whereby said compressible material is assembled between said back plate and said face plate; a support means for securing said carrying pipe within said casing pipe, said support means being adjacent to said back plate; and, a multiplicity of rods secured to said back plate, said compressible material having a passageway and said face plate having a hole for accepting each of said rods so that said rods extend through said compressible material and said face plate, whereby each of said rods are threadibly engaged with a nut which secures said face plate to said casing pipe so that when said nuts are tightened, said rods move said back plate toward said face plate thereby causing said compressible material to seal the space between the outer surface of said carrying pipe and the inner surface of said casing pipe.

4. The apparatus of claim 3 wherein at least one of said rods is secured to a means for supporting said carrying pipe within said casing pipe, said means being adjacent to said back plate.

* * * * *